Patented Nov. 19, 1940

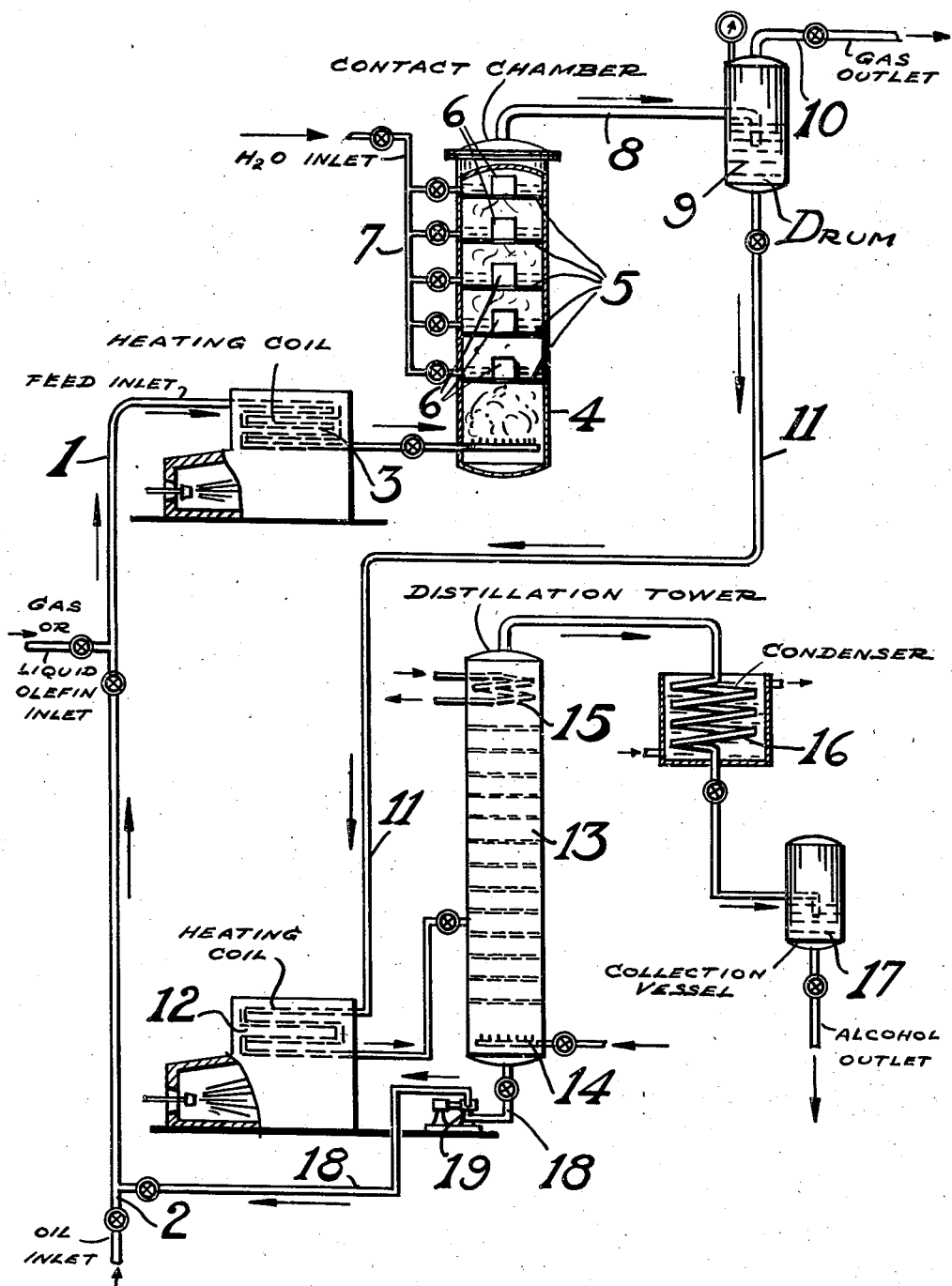

2,221,955

UNITED STATES PATENT OFFICE 2,221,955

METHOD FOR MAKING HIGHER ALCOHOLS

Helmuth G. Schneider, Roselle, N. J., assignor to Standard Alcohol Company

Application June 6, 1936, Serial No. 83,893

2 Claims. (Cl. 260—641)

The present invention relates to an improved process for producing higher alcohols from olefins, and more specifically to a catalytic process for producing alcohols containing at least four carbon atoms. The invention will be fully understood from the following description and the drawing.

The drawing represents a diagrammatic view in sectional elevation of an apparatus adapted to carry out the process of the invention and indicates the flow of materials.

The present invention is an improved method for producing higher alcohols from the corresponding olefins. In general, the processes for producing the alcohols from olefins have been known for some time. In the prior art processes most frequently employed, the olefin is brought into contact with concentrated sulfuric acid, the concentration being sufficient to effect sulfation of the olefins, and results in the production of an olefin ester of the acid. The second step in the process consists in diluting the mixture with a large quantity of water so as to reduce the acid concentration below the sulfating strength and this is followed by distillation of the alcohol from the acid. Acid may be used after reconcentration to the sulfating strength. In the present process, the function of the acid or other catalyst is quite different in that it acts as a true catalyst. Sulfuric acid may be used as the catalyst but other materials are also useful. In the case where sulfuric acid is used, it is employed in a diluted state well below the sulfating strength and preferably considerably lower. There is no necessity for further dilution and the acid is recovered in substantially the same concentration in which it was originally employed.

Referring to the drawing, pipe 1 represents the feed line by which the olefin or olefin mixture is introduced into the process. The olefin may be in gaseous state but it is preferably in the form of a liquid. If a relatively pure olefin is used, then it is desirable to add a substantial quantity of a hydrocarbon oil, the purpose of which will be disclosed below. This oil is added by the line 2 but, on the other hand, if a mixture is available in which there is a substantial quantity of saturated hydrocarbons, there may be no need to add additional oil. The mixture of saturated and unsaturated hydrocarbons passes through a heating coil 3 in which the temperature is raised to a point suitable for the reaction and the mixture is then discharged into the lower end of a contact chamber 4. This chamber may be in the form of a tower fitted with plates 5 and thus adapted to maintain a pool of liquid on each plate. The plates are fitted with bubbling caps 6 which provide for a passage of a fluid from the lower to the next higher plate, but they are not provided with overflow tubes ordinarily used in distillation towers, so that there is no means by which the liquid may flow downwardly through the tower. Water may be introduced on to each of the plates by means of the pipe 7. A suitable means, not shown, which may comprise a jacket, heating coils or the like, may be provided to maintain the reaction vessel at the preferred temperature which will be disclosed below, and the reaction product after forcing its way upwardly through this reaction tower passes out through a pipe 8 and into a drum 9 from which gaseous materials may be separated by a pipe 10. The liquid product consisting of alcohol and alcohol-oil mixture flows from the trap by means of a line 11 through a heating coil 12 and thence to an ordinary distillation tower 13. This may be fitted with the ordinary forms of rectifying plates which provide bubbling caps and overflow caps, as shown. Steam may be added at the base of the tower for heat by pipe 14 and a condensing coil 15 is provided at the top of the tower to provide reflux for distillation. The distillate flows overhead by a vapor pipe 15 through a condenser 16 and into a collection vessel 17. The unreacted oil flows from the base of the tower by a pipe 18 through a pump 19 and may be circulated through the heating coil 3 and the tower 4 as indicated before.

In the operation of the present process, it should be understood that the process is adapted particularly for the production of higher alcohol from olefins containing four carbon atoms or more. The catalyst may comprise sulfuric acid diluted below the sulfating strength. 30–65% sulfuric acid may be used, but it is preferable to employ a more diluted acid, for example, 10 or 20% or even 5%, if desired. While sulfuric acid is the best catalyst for all around operation, other materials may be used as well, for example, phosphoric acid or hydrochloric acid, preferably also in diluted concentrations. Diluted metal halide solutions may also be employed, such as cadmium, zinc, ammonium and aluminum halides. As a general rule, the more strongly acid the reaction and the material used in the catlyst, the lower is its most effective concentration in the present process. For example, phosphoric acid seems to be most effective at a concentration of about 15%. Hydrochloric acid at a strength of 2% is more effective than acetic acid at 10%, and aluminum chloride in aqueous solution at about 15% is at about the best strength while zinc chloride is best at about 15%. In the further discussion of the process, the catalyst will be referred to as sulfuric acid because this is the preferred process, although it will be understood that the other catalysts may be used in its stead.

In operating the process, the sulfuric acid or other catalyst is maintained in the reaction vessel at the preferred concentration and from the previous description it will be seen that the aqueous catalyst is held in a series of zones through which the oil and olefin mixture passes. There is a slight concentration of the catalyst due to the reaction and water must be added from time to time to maintain the proper dilute concentration of the acid. The olefin used may be in vapor phase, if desired, or it may be in liquid phase, but in either case provision is made for the mixture of vapor and liquid to pass upwardly through the tower, passing through the pool of the acid catalyst to each plate in the reaction chamber. The tower is maintained at a temperature below 300° C. and preferably above about 30° C. The upper limit to desirable to prevent side reactions and below the lower limit, the reaction rate is too small to be practically important. The preferred reaction temperature, however, is in the range from about 40° C. to 150° C. If lower olefins are used, such as butylenes, it is preferable to operate at an elevated pressure and to maintain them in a liquid state.

Pure olefins may be used such as butylene or amylene or mixtures of the type obtained by the cracking of hydrocarbon oils. A sufficient volume of saturated hydrocarbons should be present so as to effectively dissolve all of the alcohol from the acid solution. This oil may be of the type of naphtha, kerosene or gas oil and preferably can be cut at such a boiling range that it may be readily separated from the alcohol produced. In the drawing accompanying the present application, it is assumed that an oil having a boiling range well above the alcohol produced is to be used and the apparatus is connected so as to remove the alcohol by distillation from the oil. On the other hand, it will be understood that a lighter oil may be employed; for example, a light naphtha might be used and in this case the naphtha would be removed from the alcohol by distillation, and the alcohol would be recovered at the base of the tower 13.

*Example 1*

22 liters of C4 hydrocarbons containing 11% isobutylene were passed through a lead lined absorption tower at the rate of 9.5 liters per hour using 4 liters of 49% $H_2SO_4$ at 35° C. and 40 lbs. per sq. in. pressure.

Total isobutylene in feed=1452 grams
Isobutylene absorbed by acid=850 grams
Tertiary butyl alcohol recovered from spent naphtha (by distillation)=367 cc.=217 grams isobutylene
Total isobutylene extracted=1067 grams=73.15%
Per cent isobutylene absorbed, extracted as alcohol with spent naphtha=20.4%

*Example 2*

Feed rate C4 cut 81 liters per hour using 4 liters 49% $H_2SO_4$ at 45° C. and 60 lbs. per sq. in. pressure.

Total isobutylene in feed=2940 grams
Isobutylene absorbed in acid=1300 grams
Tertiary butyl alcohol in spent naphtha=875 cc., equivalent to 515 grams isobutylene
Total isobutylene reacted=62%
Per cent isobutylene absorbed, extracted as alcohol in spent naphtha=28.4%

The present process is not to be limited by any theory of the operation of the process, nor to the hydration of any particular olefin, nor to the use of any particular catalyst, but only to the following claims in which it is desired to claim all novelty inherent in the invention.

I claim:

1. A continuous process for converting an olefin into a corresponding alcohol which comprises continuously passing an olefin having at least 4 carbon atoms into a reaction zone containing water and a catalyst capable of converting said olefin to a corresponding alcohol, maintaining said reaction zone under conversion conditions, concurrently introducing into said reaction zone a solvent having a relatively higher solvent power for the said alcohol than for the other constituents in said reaction zone, continuously withdrawing from the reaction zone the solvent containing alcohol dissolved therein and separating alcohol therefrom.

2. A process for converting an olefin having 4 carbon atoms to the molecule to a corresponding alcohol which comprises passing said olefin into a reaction zone containing sulfuric acid of 30 to 65% concentration, maintaining said reaction zone under conversion conditions, concurrently introducing in said reaction zone water sufficient to compensate for the water used up in the reaction to form the alcohol and a solvent having a relatively higher solvent power for said alcohol than for other constituents in said reaction zone, continuously withdrawing the solvent containing alcohol dissolved therein from the reaction zone and separating the alcohol therefrom.

HELMUTH G. SCHNEIDER.